US009624863B1

(12) United States Patent
Ge et al.

(10) Patent No.: US 9,624,863 B1
(45) Date of Patent: Apr. 18, 2017

(54) SYSTEM AND METHOD FOR SUPPLYING FUEL TO ENGINE

(71) Applicant: Caterpillar Inc., Peoria, IL (US)

(72) Inventors: Xinyu Ge, Preoria, IL (US); Shuowei Yang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/924,750

(22) Filed: Oct. 28, 2015

(51) Int. Cl.
*F02D 41/26* (2006.01)
*F02M 37/00* (2006.01)

(52) U.S. Cl.
CPC ....... *F02D 41/263* (2013.01); *F02M 37/0052* (2013.01)

(58) Field of Classification Search
CPC .... F02D 41/26; F02D 41/263; F02B 19/1023; F02M 37/00; F02M 37/0052; Y02T 10/125
USPC .......... 701/102–104, 114, 115; 123/250.253, 123/258–261, 264; 73/35.12, 114.06, 73/114.38, 114.42, 114.43, 114.51
See application file for complete search history.

(56) References Cited

U.S. PATENT DOCUMENTS

| 6,003,543 | A | 12/1999 | Sulatisky et al. |
| 6,131,552 | A | 10/2000 | Paielli et al. |
| 6,701,905 | B1 | 3/2004 | Gaskins |
| 6,830,061 | B2 | 12/2004 | Adams et al. |
| 7,958,866 | B2 | 6/2011 | Thomas |
| 8,136,506 | B1 | 3/2012 | Guglielmo et al. |
| 8,286,611 | B1 | 10/2012 | Guglielmo et al. |
| 2002/0002962 | A1* | 1/2002 | Ibrahim ................ F02B 17/005 123/276 |
| 2011/0271930 | A1* | 11/2011 | Ishida ........................ F01P 3/16 123/275 |
| 2013/0000596 | A1* | 1/2013 | Diaz Escano ......... F02B 17/005 123/25 A |
| 2014/0144406 | A1 | 5/2014 | Schock et al. |
| 2015/0260095 | A1* | 9/2015 | Hinderks ................... B63B 1/28 123/568.11 |

FOREIGN PATENT DOCUMENTS

| CA | 2207497 | 4/2005 |
| EP | 1748178 | 1/2007 |
| JP | 2007113463 | 5/2007 |
| JP | 2008248750 | 10/2008 |
| JP | 2009203952 | 9/2009 |

* cited by examiner

*Primary Examiner* — John Kwon
*Assistant Examiner* — Johnny H Hoang

(57) ABSTRACT

A system for supplying fuel to an engine is disclosed. The system includes a first sensing unit for determining multiple operating parameters and multiple ambient conditions of the engine. The system includes an adaptive adjustment mechanism, a pressure regulator having a first valve and a second valve, and a controller communicating with the adaptive adjustment mechanism and the pressure regulator. The controller determines a first error and a second error associated with a pressure of a fuel supply to a pre-combustion chamber and a main combustion chamber, respectively, and receives an output signal indicative of an adjustment factor determined by the adaptive adjustment mechanism. The controller controls the first valve and the second valve based on the first error, the second error, and the output signal, to supply the fuel to the pre-combustion chamber and the main combustion chamber at a first pressure and a second pressure, respectively.

20 Claims, 7 Drawing Sheets

SYSTEM AND METHOD FOR SUPPLYING FUEL TO ENGINE

TECHNICAL FIELD

The present disclosure relates to a system and a method for supplying fuel to an engine.

BACKGROUND

Engines, such as gas engines, are used in various stationary applications, such as a generator set and mobile applications, such as on-road vehicles and off-road vehicles. Due to emission regulations, natural gas engines may be utilized to supply power to the stationary and the mobile applications. Gaseous fuel, such as Compressed Natural Gas (CNG) is generally stored in a tank under high pressure, for example, 250-350 bars. Storing the gaseous fuel under the high pressure and communicating the gaseous fuel with the engine is generally incompatible for an operation of the engine. Further, the pressure of the gas impacts Air Fuel Ratio (AFR) control. Conventionally, mechanical pressure regulators are used for regulating pressure of the gaseous fuel supplied to a main combustion chamber and a pre combustion chamber of the engine.

U.S. Pat. No. 6,131,552 (the '552 patent) discloses a fuel control system for delivering gaseous fuel from a source through an air-fuel mixture to a gas-operated engine. The fuel control system includes a sensor to provide a signal responsive to engine operating conditions. An electronic control unit (ECU) is responsive to the signal for providing a fuel control signal indicative of a desired quantity of fuel to be delivered to the engine. A pressure regulator is responsive to the fuel control signal for controlling delivery of gaseous fuel to the mixer. However, the pressure regulator disclosed in the '552 patent may not provide sufficient control of pressure of the gaseous fuel supplied to the engine.

SUMMARY OF THE DISCLOSURE

In one aspect of the present disclosure, a system for supplying fuel to an engine is provided. The system includes a first sensing unit configured to generate signals indicative of multiple operating parameters of the engine, and multiple ambient conditions. The system further includes an adaptive adjustment mechanism in communication with the first sensing unit. The system further includes a pressure regulator having a first valve in communication with a pre-combustion chamber of the engine, and a second valve in communication with a main combustion chamber of the engine. The system further includes a controller in communication with the adaptive adjustment mechanism and the pressure regulator. The controller is configured to receive a signal indicative of a first error associated with a pressure of a fuel supply to the pre-combustion chamber and receive a signal indicative of a second error associated with a pressure of a fuel supply to the main combustion chamber. The controller is further configured to receive, using the adaptive adjustment mechanism, an output signal indicative of an adjustment factor. The adjustment factor is determined based on the multiple operating parameters of the engine and the multiple ambient conditions. The controller is further configured to control the first valve of the pressure regulator based on the signals indicative of the first error, the second error, and the output signal indicative of the adjustment factor, to supply the fuel to the pre-combustion chamber at a first pressure. The controller is further configured to control the second valve of the pressure regulator based on the signals indicative of the first error, the second error, and the output signal indicative of the adjustment factor, to supply the fuel to the main combustion chamber at a second pressure.

In another aspect of the present disclosure, a method of supplying fuel to an engine is provided. The method includes determining multiple operating parameters of the engine and determining multiple ambient conditions of the engine. The method further includes determining, using a control module, a first error and a second error associated with a pressure of a fuel supply to a pre-combustion chamber and a main combustion chamber of the engine, respectively, based on the multiple operating parameters of the engine and the multiple ambient conditions. The method further includes determining, using an adaptive adjustment mechanism, an adjustment factor based on the multiple operating parameters of the engine and the multiple ambient conditions. The method further includes controlling a first valve of a pressure regulator communicated to the engine to supply the fuel to the pre-combustion chamber at a first pressure based on the first error, the second error, and the adjustment factor. The method further includes controlling a second valve of the pressure regulator communicated to the engine to supply the fuel to the main combustion chamber at a second pressure based on the first error, the second error, and the adjustment factor.

In yet another aspect of the present disclosure, an engine is provided. The engine includes a main combustion chamber and a pre-combustion chamber in communication with the main combustion chamber. The engine further includes a system for supplying fuel to the main combustion chamber and the pre-combustion chamber. The system includes a first sensing unit configured to generate signals indicative of multiple operating parameters of the engine and multiple ambient conditions. The system further includes an adaptive adjustment mechanism in communication with the first sensing unit. The system further includes a pressure regulator having a first valve in communication with a pre-combustion chamber of the engine and a second valve in communication with a main combustion chamber of the engine. The system further includes a controller in communication with the adaptive adjustment mechanism and the pressure regulator. The controller is configured to receive a signal indicative of a first error associated with a pressure of a fuel supply to the pre-combustion chamber. The controller is further configured to receive a signal indicative of a second error associated with a pressure of a fuel supply to the main combustion chamber. The controller is further configured to receive, using the adaptive adjustment mechanism, an output signal indicative of an adjustment factor determined based on the multiple operating parameters of the engine and the multiple ambient conditions. The controller is further configured to control the first valve of the pressure regulator, based on the signals indicative of the first error, the second error, and the output signal indicative of the adjustment factor, to supply the fuel to the pre-combustion chamber at a first pressure. The controller is further configured to control the second valve of the pressure regulator, based on the signals indicative of the first error, the second error, and the output signal indicative of the adjustment factor, to supply the fuel to the main combustion chamber at a second pressure.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
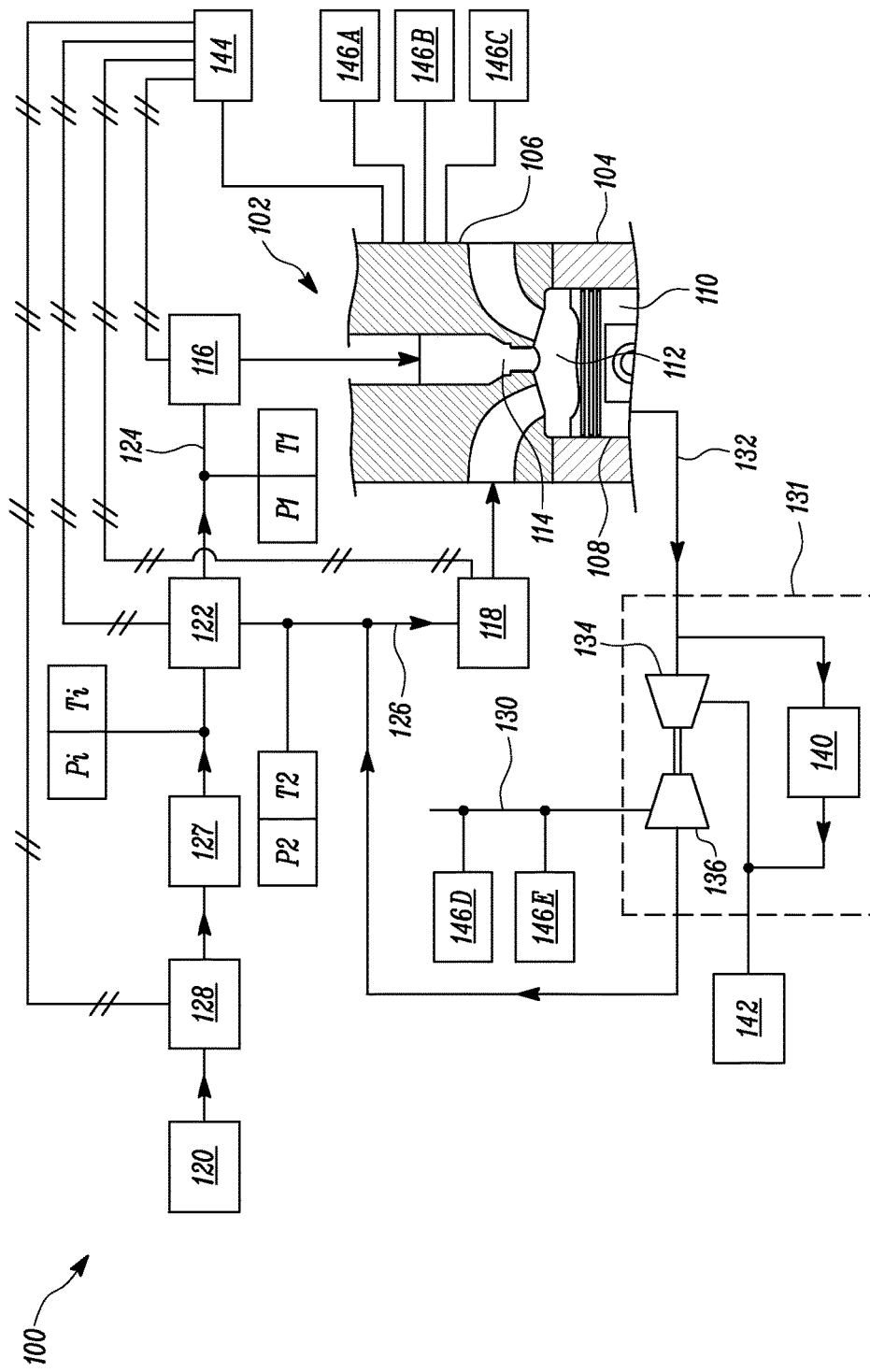
FIG. 1 is a schematic block diagram of a system for supplying fuel to an engine, according to an embodiment of the present disclosure.

FIG. 1 illustrates a schematic block diagram of a system 100 for supplying fuel to an engine 102, according to an embodiment of the present disclosure. The engine 102 may be an internal combustion engine, such as a reciprocating piston engine. Further, the engine 102 may be a spark ignition engine or a compression ignition engine. The engine 102 may use a gaseous fuel as a primary fuel, such as compressed natural gas (CNG), liquefied petroleum gas (LPG), hydrogen, other gaseous combustion fuel suitable for use with the engine 102, or any combination thereof. The engine 102 may be used to provide power to any machine including, but not limited to, an on-highway vehicle, an off-highway vehicle, an earth moving machine, and an electric generator. Further, the engine 102 may be associated with any industry including, but not limited to, transportation, construction, agriculture, forestry, power generation, and material handling. The engine 102 may also include various systems such as, an intake system, an exhaust system, a cooling system, and a drivetrain.

The engine 102 includes a cylinder block 104 and a cylinder head 106 mounted on the cylinder block 104. The cylinder block 104 may include one or more cylinders 108. In FIG. 1, only one cylinder 108 is shown for illustration purposes of the present disclosure. A piston 110 is slidably disposed within the cylinder 108. The piston 110 moves between a top position and a bottom position within the cylinder 108 during operation of the engine 102. At the top position of the piston 110, a main combustion chamber 112 is defined in the cylinder 108 by the piston 110 and the cylinder head 106. The engine 102 also includes a pre-combustion chamber 114 defined in the cylinder head 106. The main combustion chamber 112 is in fluid communication with the pre-combustion chamber 114 via a channel or a nozzle (not shown). The pre-combustion chamber 114 may be disposed such that partially combusted products from the pre-combustion chamber 114 may be forced through the channel or the nozzle to the main combustion chamber 112 in which a mixture of the fuel and air is ignited by the partially combusted products. In some operating conditions, the mixture of the fuel and the air in the main combustion chamber 112 may be ignited by a spark plug inside of the main combustion chamber 112 and no fuel may be supplied to the pre-combustion chamber 114 to facilitate combustion in the main combustion chamber 112. It may be understood that the cylinder 108, the piston 110, the main combustion chamber 112, and the pre-combustion chamber 114 of the engine 102 are illustrated in a schematic manner in FIG. 1 only to show the relative relationships with various components of the system 100.

The engine 102 further includes a first gas admission valve 116 configured to communicate to the pre-combustion chamber 114 of the engine 102. The first gas admission valve 116 is configured to selectively supply the fuel to the pre-combustion chamber 114. The engine 102 further includes a second gas admission valve 118 configured to communicate to the main combustion chamber 112 of the engine 102. The second gas admission valve 118 is configured to selectively supply the fuel to the main combustion chamber 112. The first gas admission valve 116 and the second gas admission valve 118 may be disposed at any location in a fuel supply line associated with the engine 102 to selectively supply the fuel to the pre-combustion chamber 114 and the main combustion chamber 112, respectively, during the operation of the engine 102.

The system 100 further includes a fuel supply tank 120 configured to store the fuel, such as compressed natural gas (CNG). Since the fuel is stored at a high pressure, in the gaseous form, the fuel supply tank 120 may be adapted to withstand the high pressure. The system 100 further includes a pressure regulator 122 in fluid communication with the fuel supply tank 120 and the engine 102. The pressure regulator 122 is configured to regulate pressure of the fuel supplied from the fuel supply tank 120 to the engine 102. In particular, the pressure regulator 122 is configured to independently regulate the pressure of the fuel supplied to both the main combustion chamber 112 and the pre-combustion chamber 114 of the engine 102.

The pressure regulator 122 is fluidly coupled to the first gas admission valve 116 by a first fuel supply line 124, and is fluidly coupled to the second gas admission valve 118 by a second fuel supply line 126. The first fuel supply line 124 and the second fuel supply lines 126 are each configured to receive the fuel at different pressures therethrough. The first gas admission valve 116 and the second gas admission valve 118 may be optionally disposed at any location in the first fuel supply line 124 and the second fuel supply line 126 to selectively supply the fuel to the pre-combustion chamber 114 and the main combustion chamber 112, respectively, at different pressures. The system 100 further includes an input pressure sensor 'Pi' and an input temperature sensor 'Ti' disposed upstream of the pressure regulator 122 to determine an input pressure and an input temperature, respectively, of the fuel supplied to the pressure regulator 122. The input pressure sensor 'Pi' and the input temperature sensor 'Ti' may be fluidly coupled to the fuel supply line that fluidly communicates the pressure regulator 122 with the fuel supply tank 120 to generate signals indicative of the input pressure and the input temperature, respectively, of the fuel supplied to the pressure regulator 122. Additional sensors may also be optionally disposed upstream of the pressure regulator 122 to determine other input parameters of the pressure regulator 122. The pressure regulator 122 will be described in detail in FIG. 3.

The system 100 further includes a first pressure sensor 'P1' and a first temperature sensor 'T1' disposed downstream of the pressure regulator 122. Particularly, the first pressure sensor 'P1' and the first temperature sensor 'T1' are disposed in the first fuel supply line 124 to generate signals indicative of a first pressure and a first temperature, respectively, of the fuel supplied to the pre-combustion chamber 114. Additional sensors may also be optionally disposed in the first fuel supply line 124 downstream of the pressure regulator 122 to determine other parameters, such as a flow rate of the fuel in the first fuel supply line 124. The system 100 further includes a second pressure sensor 'P2' and a second temperature sensor 'T2' disposed downstream of the pressure regulator 122. Particularly, the second pressure sensor 'P2' and the second temperature sensor 'T2' are disposed in the second fuel supply line 126 to generate signals indicative of a second pressure and a second temperature, respectively, of the fuel supplied to the main combustion chamber 112. Additional sensors may also be optionally disposed in the second fuel supply line 126 downstream of the pressure regulator 122 to determine other parameters, such as a flow rate of the fuel in the second fuel supply line 126.

A shut off valve 128 is disposed between the pressure regulator 122 and the fuel supply tank 120. The shut off valve 128 is configured to be in fluid communication with the fuel supply tank 120 to selectively allow a flow of the fuel to the engine 102 via the pressure regulator 122. A filter 127 is disposed downstream of the shut off valve 128 and upstream of the pressure regulator 122. The filter 127 is configured to filter polluting elements such as, dust and foreign particles from the fuel before the fuel enters into the pressure regulator 122. In an example, one or more pressure sensors and temperature sensors may be disposed upstream of the fuel supply tank 120 to determine a temperature and a pressure of the fuel supplied from the fuel supply tank 120. One or more pressure sensors and temperature sensors may be optionally disposed at any location in the fuel supply tank 120 to determine the temperature and the pressure of the fuel contained in the fuel supply tank 120.

A turbocharger system 131 is shown in FIG. 1. Furthermore, the turbocharger system 131 may include a turbine 134 coupled to a compressor 136. The turbocharger system 131 may be coupled to an exhaust gas line 132 of the engine 102 such that exhaust gas generated during the operation of the engine 102 is utilized for driving the turbine 134. The compressor 136 may be utilized for receiving the ambient air. In the illustrated embodiment, the compressor 136 is coupled to the second fuel supply line 126. The compressor 136 is configured to receive the ambient air via an intake line 130. The compressor 136 further compresses the ambient air to increase a pressure thereof and generate pressurized air. The compressor 136 can supply the pressurized air along with the fuel supplied through the second fuel supply line 126. In an alternative embodiment, a separate compressor unit may be coupled to the second fuel supply line 126. The compressor 136 may receive ambient air and compress the ambient air to increase a pressure thereof. In an example, the compressor 136 may be powered by an external drive member, such as an electric motor. A control valve 140 may be coupled to the exhaust gas line 132 parallel to the turbine 134 to bypass a flow of the exhaust gas such that a speed of the turbine 134 may be regulated. Further, an aftertreatment system 142 is disposed in the exhaust gas line 132 downstream of the turbine 134 to treat the exhaust gas and hence to control emission of the engine 102.

Figure 2:
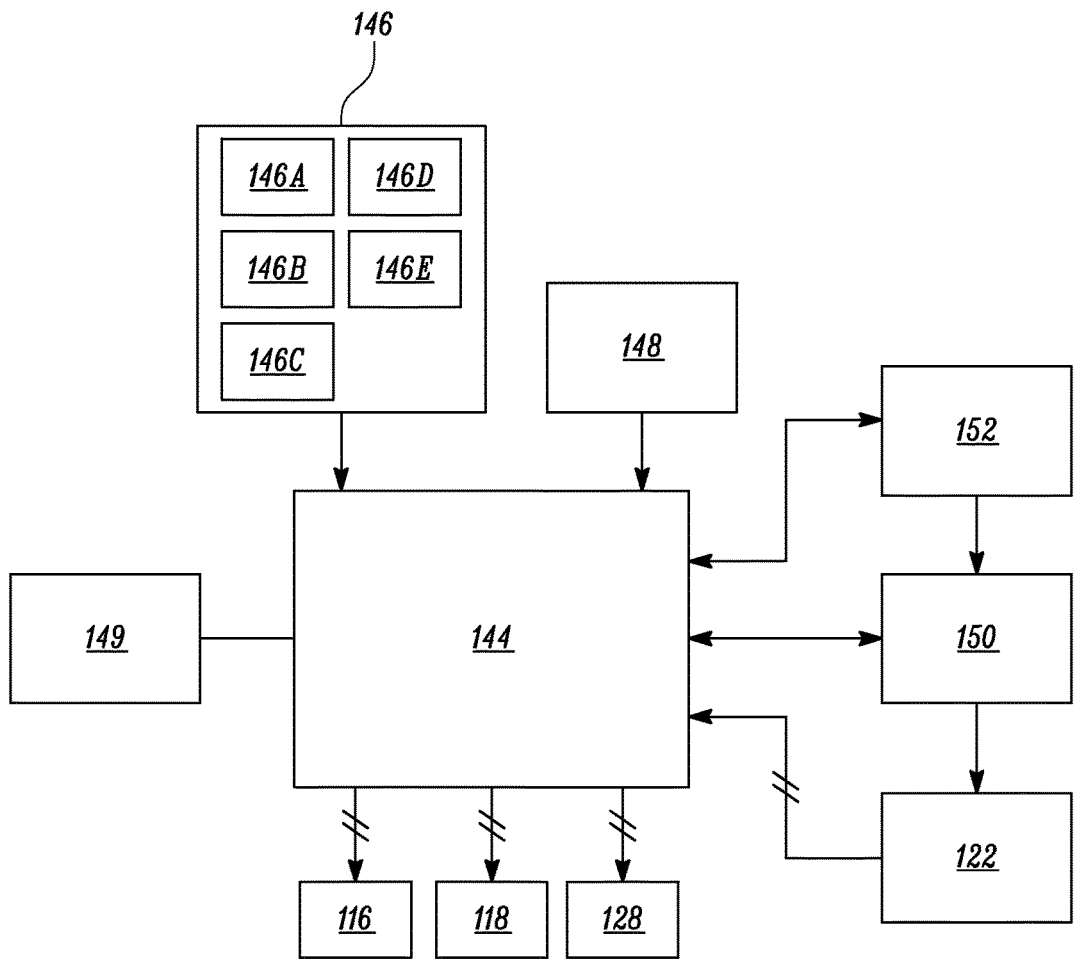
FIG. 2 is a schematic block diagram of a control module of the system, according to an embodiment of the present disclosure.

FIG. 2 illustrates a schematic block diagram of a control module 144 of the system 100, according to an embodiment of the present disclosure. The control module 144 is configured to communicate to the engine 102 to determine various operating parameters of the engine 102 and to control an operation of the engine 102. In an example, the control module 144 may be an Engine Control Unit (ECU). In another example, the control module 144 may be an Electronic Control Module (ECM), which may be programmed to perform various functions described herein below. The control module 144 is in communication with a first sensing unit 146 associated with the engine 102. The first sensing unit 146 is configured to generate signals indicative of multiple operating parameters of the engine 102 and multiple ambient conditions of the engine 102. In the illustrated embodiment, the first sensing unit 146 includes a speed sensor 146A disposed on the engine 102 to generate a signal indicative of a speed of the engine 102. In one example, the speed sensor 146A may be coupled to a crankshaft of the engine 102. In another example, the speed sensor 146A may be disposed on one or more rotating components of the engine 102 such as, a flywheel, a gear train drive, and/or a camshaft. In yet another example, the speed sensor 146A may be disposed at any location in the engine 102. The first sensing unit 146 further includes a fuel flow rate sensor 146B disposed at any location in the fuel supply line to generate a signal indicative of a quantity of the fuel supplied to the engine 102. In an example, the fuel flow rate sensor 146B may be coupled to one or more components, such as the pressure regulator 122, the first fuel supply line 124, the second fuel supply line 126, the first gas admission valve 116 and/or the second gas admission valve 118 associated with a fuel supply to the engine 102. In various examples, the fuel flow rate sensor 146B may be disposed in various components such as, a fuel flow control valve, a check valve and/or any other valves disposed in the fuel supply line. The first sensing unit 146 further includes a detonation sensor 146C to determine an ignition mode of the engine 102. The detonation sensor 146C may be disposed at any location in the engine 102. The operating parameters of the engine 102 determined based on the signals received from the sensors, such as the speed sensor 146A, and the multiple ambient conditions of the engine 102 may be used for determining the ignition mode of the engine 102. For an example, the ignition mode may include cold start mode, normal mode or starting of the engine 102 at an altitude. The cold start mode may correspond to ignition of the engine 102 at a temperature below a predefined minimum temperature of the ambient condition. The normal mode may correspond to ignition of the engine 102 at a temperature below a predefined maximum temperature and above the predefined minimum temperature of the ambient condition. Ignition of the engine 102 at a high altitude or a low altitude may be determined based on air-fuel ratio. Apart from the detonation sensor 146C, other sensors may also be disposed at any location in the engine 102 to determine various operating parameters of the engine 102 and environmental factors, and hence to determine the ignition mode of the engine 102 collectively. The control module 144 communicates with the speed sensor 146A, the fuel flow rate sensor 146B and the detonation sensor 146C to receive the signals indicative of the speed of the engine 102, the quantity of the fuel supplied to the engine 102 and the ignition mode of the engine 102.

The first sensing unit 146 further includes a first sensor 146D configured to generate a signal indicative of ambient pressure and a second sensor 146E configured to generate a signal indicative of ambient temperature. In one embodiment, the first sensor 146D and the second sensor 146E may be located at the intake line 130 of the compressor 136 to communicate with the ambient air received in the compressor 136. In other embodiments, the first sensor 146D and the second sensor 146E may be disposed at any location in the engine 102 or disposed in the vicinity of the engine 102 to generate a signal indicative of the ambient pressure and the ambient temperature, respectively. The control module 144 communicates with the first sensor 146D and the second sensor 146E to receive the signals indicative of the ambient pressure and the ambient temperature, respectively. The control module 144 is also configured to communicate with a second sensing unit 148 including the first pressure sensor 'P1' and the second pressure sensor 'P2' to receive the signals indicative of the first pressure and the second pressure of the fuel supplied to the pre-combustion chamber 114 and the main combustion chamber 112, respectively. The second sensing unit 148 may also include the first temperature sensor 'T1', the second temperature sensor 'T2', and additional sensors to determine other parameters of the fuel flowing through the first fuel supply line 124 and the second fuel supply line 126.

The control module 144 may be further communicated to the shut off valve 128 to restrict or allow flow of the fuel from the fuel supply tank 120 to the engine 102. The control module 144 may also be communicated to the first gas admission valve 116 and the second gas admission valve 118. The control module 144 may actuate the first gas admission valve 116 to regulate admission of the fuel to the pre-combustion chamber 114 of the engine 102. Similarly, the control module 144 may actuate the second gas admission valve 118 to regulate admission of the fuel to the main combustion chamber 112 of the engine 102. The control module 144 may actuate the first gas admission valve 116 and the second gas admission valve 118 based on various operating parameters of the engine 102. Communication lines between the control module 144 and the various components of the system 100, such as the first gas admission valve 116, the second gas admission valve 118 and the shut off valve 128 may be represented in the figures as connection lines with an inclined double dash. The communication lines may include one or more data buses, fiber optic cables and/or embedded connections.

It may be understood that the control module 144 may be a logic unit using any one or more of a processor, a microprocessor, and a microcontroller. The control module 144 may be based on integrated circuitry, discrete components, or a combination of the two. It will be appreciated that other peripheral circuitry, such as buffers, latches, switches and the like may be implemented within the control module 144 or separately connected to the control module 144. The control module 144 further includes a memory module 149 for storing various input data and output data associated with processing of the control module 144. The input data provided by an operator may be stored in the memory module 149.

The system 100 further includes a controller 150 configured to communicate to the pressure regulator 122 to regulate the pressure of the fuel flowing to the pre-combustion chamber 114 to the first pressure and the pressure of the fuel flowing to the main combustion chamber 112 to the second pressure. In one embodiment, the controller 150 may be integrated within the control module 144. In another embodiment, the controller 150 may be an individual component communicated to the control module 144 and the pressure regulator 122. Further, the controller 150 is configured to generate multiple outputs to control the first pressure of the fuel flowing to the pre-combustion chamber 114 and the second pressure of the fuel flowing to the main combustion chamber 112 based on multiple inputs including, but not limited to, the multiple operating parameters and the multiple ambient conditions of the engine 102.

The system 100 further includes an adaptive adjustment mechanism 152 configured to communicate with the first sensing unit 146, the pressure regulator 122 and the controller 150. The adaptive adjustment mechanism 152 is also configured to communicate with the control module 144. In one embodiment, the adaptive adjustment mechanism 152 may be integrated within the control module 144. In another embodiment, the adaptive adjustment mechanism 152 may be an individual component communicated to the control module 144 and the controller 150.

Figure 3:
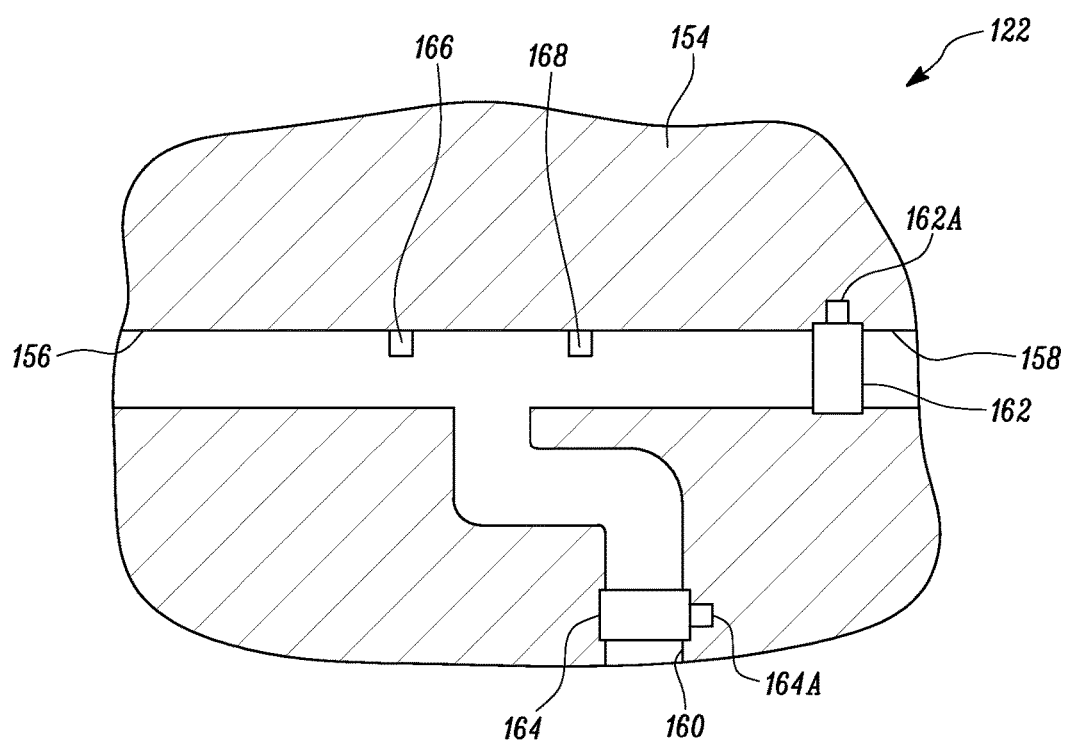
FIG. 3 is a schematic representation of a sectional view of a pressure regulator associated with the system of FIG. 1, according to an embodiment of the present disclosure.

FIG. 3 illustrates a schematic representation of a sectional view of the pressure regulator 122, according to an embodiment of the present disclosure. The pressure regulator 122 includes a housing 154 to support various elements. The housing 154 includes an inlet port 156 for receiving the fuel from the fuel supply tank 120 to inside of the housing 154 of the pressure regulator 122. The inlet port 156 may be fluidly coupled to the fuel supply tank 120 via the fuel supply line. The housing 154 further includes a first outlet port 158 and a second outlet port 160. The first outlet port 158 is fluidly coupled to the first fuel supply line 124 to communicate to the pre-combustion chamber 114 and the second outlet port 160 is fluidly coupled to the second fuel supply line 126 to communicate to the main combustion chamber 112. It may be understood that the first fuel supply line 124 and the second fuel supply line 126 may be in the form of a pipe, a conduit, a tube or the like.

The pressure regulator 122 further includes a first valve 162 located in the first outlet port 158 to control the first pressure of the fuel supplied to the pre-combustion chamber 114. The pressure regulator 122 further includes a second valve 164 located in the second outlet port 160 to control the second pressure of the fuel supplied to the main combustion chamber 112. In an alternative embodiment, a third valve may be disposed in the inlet port 156 to control the pressure of the fuel received inside the pressure regulator 122. In an example, the first valve 162 and the second valve 164 may be one of a poppet valve, a butterfly valve, or a globe valve. The pressure regulator 122 further includes a first actuator 162A associated with the first valve 162 and a second actuator 164A associated with the second valve 164. The first actuator 162A and the second actuator 164A may be configured to control opening and closing of the first valve 162 and the second valve 164 to regulate the first pressure and the second pressure of the fuel flowing through the first outlet port 158 and the second outlet port 160 to the pre-combustion chamber 114 and the main combustion chamber 112, respectively. In an example, the first actuator 162A and the second actuator 164A may be proportional controlled solenoid.

The pressure regulator 122 further includes a pressure sensor 166 and a temperature sensor 168 located inside the housing 154 to generate signals indicative of a pressure and a temperature, respectively, of the fuel inside the housing 154 of the pressure regulator 122. The adaptive adjustment mechanism 152 is configured to communicate with the pressure regulator 122 to receive the signals indicative of the pressure and the temperature of the fuel inside the housing 154.

Figure 4:
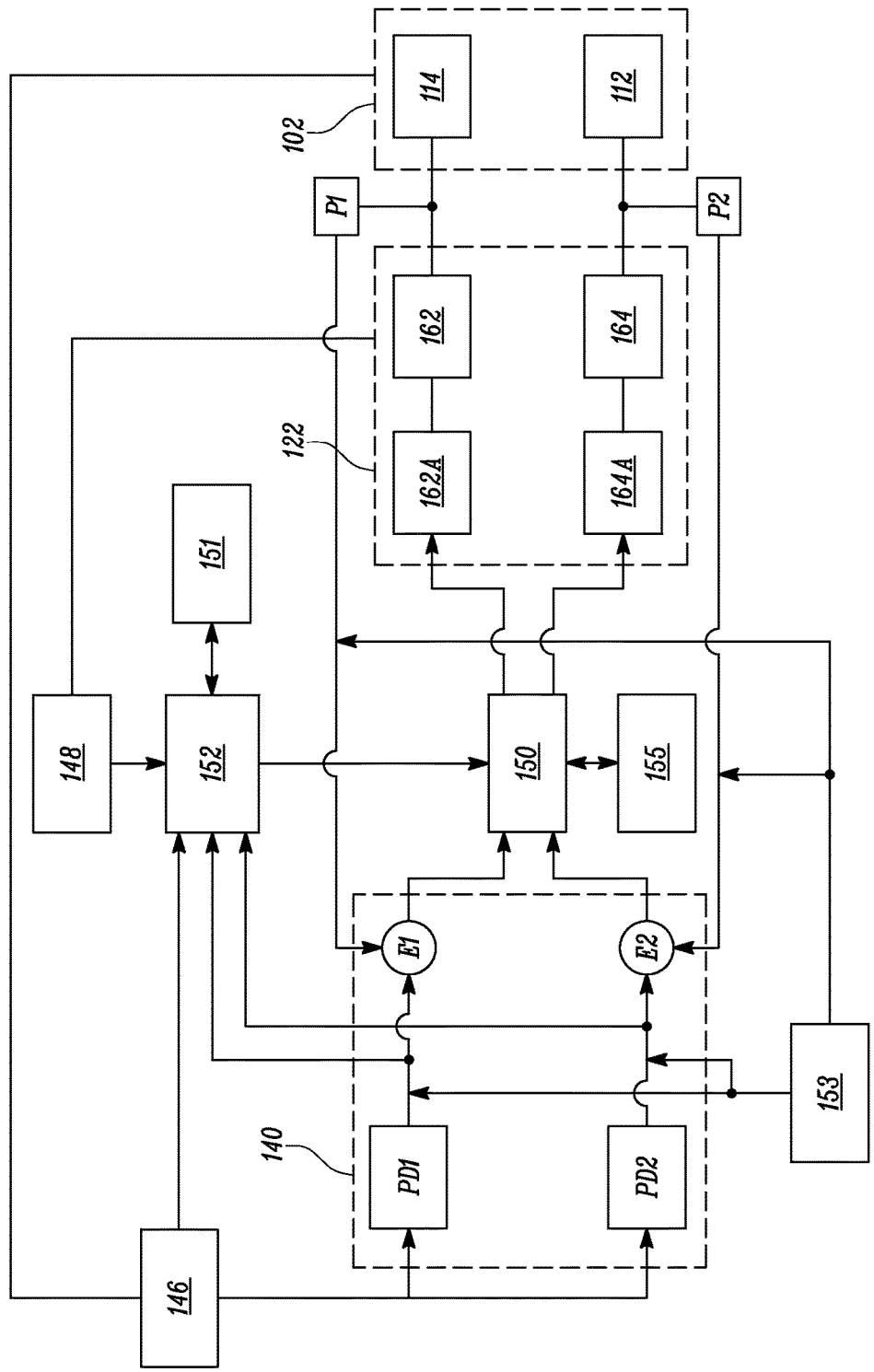
FIG. 4 is a block diagram showing controlling of a pressure of the fuel supplied to a main combustion chamber and a pre-combustion chamber of the engine, according to an embodiment of the present disclosure.

FIG. 4 shows a block diagram illustrating controlling of the pressure of the fuel supplied to the main combustion chamber 112 and the pre-combustion chamber 114 of the engine 102, according to an embodiment of the present disclosure. The system 100 includes the control module 144 in communication with the first sensing unit 146 and the second sensing unit 148. Particularly, the control module 144, in communication with the speed sensor 146A, the fuel flow rate sensor 146B, and the detonation sensor 146C, receives the signals indicative of the speed of the engine 102, the quantity of the fuel supplied to the engine 102 and the derived ignition mode for the current operation, respectively. Further, the control module 144, in communication with the first sensor 146D and the second sensor 146E, receives the signals indicative of the ambient pressure and the ambient temperature, respectively, of the engine 102. The control module 144 further determines the speed of the engine 102, the quantity of the fuel supplied to the engine 102, the ignition mode of the engine 102, and the ambient pressure and temperature of the engine 102. The control module 144 further determines a first desired pressure 'PD1' of the fuel based on the speed of the engine 102, the quantity of the fuel supplied to the engine 102, the ignition mode of the engine 102, and the ambient pressure and temperature of the engine 102. The first desired pressure 'PD1' of the fuel is a pressure at which the fuel to be supplied to the pre-combustion chamber 114 of the engine 102. In an embodiment, the first desired pressure 'PD1' may be determined based on a predefined mathematical relationship between the speed of the engine 102, the quantity of the fuel supplied to the engine 102, the ignition mode of the engine 102, and the ambient pressure and temperature of the engine 102. In another embodiment, the first desired pressure 'PD1' may be determined based on a predefined data, such as a look up table, stored in the memory module 149 of the control module 144.

The control module 144 further determines a second desired pressure 'PD2' of the fuel based on the speed of the engine 102, the quantity of the fuel supplied to the engine 102, the ignition mode of the engine 102, and the ambient pressure and temperature of the engine 102. The second desired pressure 'PD2' of the fuel is a pressure at which the fuel to be supplied to the main combustion chamber 112 of the engine 102. In an embodiment, the second desired pressure 'PD2' may be determined based on a predefined mathematical relationship between the speed of the engine 102, the quantity of the fuel supplied to the engine 102, the ignition mode of the engine 102, and the ambient pressure and temperature of the engine 102. In another embodiment, the second desired pressure 'PD2' may be determined based on a predefined data, such as a look up table, stored in the memory module 149 of the control module 144.

The control module 144 is further configured to determine a first error 'E1' based on the first desired pressure 'PD1' and the first pressure of the fuel supplied to the pre-combustion chamber 114. The control module 144, in communication with the first pressure sensor 'P1' receives the signal indicative of the first pressure of the fuel supplied to the pre-combustion chamber 114. In an example, the first error 'E1' may be a difference between a value of the first desired pressure 'PD1' and the first pressure of the fuel supplied to the pre-combustion chamber 114. The first error 'E1' may be optionally determined based on a mathematical relationship, such as a ratio, of the first desired pressure 'PD1' and the first pressure of the fuel. In various embodiments, the control module 144 may be configured to derive the first error 'E1' based on any mathematical relationship between the first pressure of the fuel and the first desired pressure 'PD1'.

The control module 144 is further configured to determine a second error 'E2' based on the second desired pressure 'PD2' and the second pressure of the fuel supplied to the main combustion chamber 112. The control module 144, in communication with the second pressure sensor P2' receives the signal indicative of the second pressure of the fuel supplied to the main combustion chamber 112. In an example, the second error 'E2' may be a difference between a value of the second desired pressure 'PD2' and the second pressure of the fuel supplied to the main combustion chamber 112. The second error 'E2' may optionally be determined based on a mathematical relationship, such as a ratio, of the second desired pressure 'PD2' and the second pressure of the fuel. In various embodiments, the control module 144 may be configured to derive the second error 'E2' based on any mathematical relationship between the second pressure of the fuel and the second desired pressure 'PD2'.

The control module 144 is further configured to generate a signal indicative of the first error 'E1' and a signal indicative of the second error 'E2'. The controller 150, in communication with the control module 144, receives the signals indicative of the first error 'E1' and the second error 'E2'. The controller 150 is also in communication with the adaptive adjustment mechanism 152 to receive an output signal indicative of an adjustment factor determined based on the speed of the engine 102, the quantity of the fuel supplied to the engine 102, the ignition mode of the engine 102, and the ambient pressure and temperature of the engine 102.

In an exemplary embodiment, the adaptive adjustment mechanism 152 may have multiple input signals indicative of the multiple operating parameters of the engine 102 and the multiple ambient conditions of the engine 102. The adaptive adjustment mechanism 152 may be configured to estimate one or more control parameters corresponding to the system 100 using the multiple operating parameters and the multiple ambient conditions of the engine 102 in real time. The one or more control parameters may be time variant and/or having uncertain initial conditions. The estimated one or more control parameters may be used to determine the adjustment factor.

The adaptive adjustment mechanism 152 is in further communication with the control module 144 to receive a signal indicative of the first desired pressure 'PD1' of the fuel to be supplied to the pre-combustion chamber 114 and a signal indicative of the second desired pressure 'PD2' of the fuel to be supplied to the main combustion chamber 112. The adaptive adjustment mechanism 152 is further configured to determine the adjustment factor based on the signals indicative of the first desired pressure 'PD1' and the second desired pressure 'PD2' of the fuel.

The adaptive adjustment mechanism 152 is in further communication with the pressure regulator 122. Particularly, the adaptive adjustment mechanism 152 is in communication with the pressure sensor 166 and the temperature sensor 168 of the pressure regulator 122 to receive the signals indicative of the pressure and the temperature of the fuel received within the pressure regulator 122. The adaptive adjustment mechanism 152 is further configured to determine the adjustment factor based on the signals indicative of the pressure and the temperature of the fuel received within the pressure regulator 122.

In one embodiment, the adaptive adjustment mechanism 152 is in communication with a first uncertainty recognition mechanism 151. In an example, the first uncertainty recognition mechanism 151 may be integrally configured with the adaptive adjustment mechanism 152 and/or the controller 150. In another example, the first uncertainty recognition mechanism 151 may be integrally configured with the control module 144. The first uncertainty recognition mechanism 151 may be configured to determine or derive internal uncertainties associated with various components, such as the first valve 162 and the second valve 164 of the pressure regulator 122, and various components of the engine 102. The first uncertainty recognition mechanism 151 may also be configured to determine or derive internal uncertainties associated with various input parameters, such as the speed of the engine 102, the quantity of the fuel supplied to the engine 102, the ambient pressure and temperature of the engine 102, the input pressure and the input temperature of the fuel supplied to the pressure regulator 122, the first pressure and the first temperature of the fuel supplied to the pre-combustion chamber 114, the second pressure and the second temperature of the fuel supplied to the main combustion chamber 112, and the pressure and temperature of the fuel received within the housing 154 of the pressure regulator 122. In an example, the internal uncertainties may include deviation in opening and closing of the first valve 162 and the second valve 164, which may be determined based on signals indicative of a position of the first valve 162 and the second valve 164 generated by sensor devices associated with the first valve 162 and the second valve 164. In another example, the internal uncertainties may include a deviation in the input pressure of the fuel supplied to the pressure regulator 122 and the first pressure and the second pressure of the fuel supplied to the pre-combustion chamber 114 and the main combustion chamber 112, respectively. The uncertainties may be optionally determined based on a predefined data, such as a look up table, stored in the memory module 149 of the control module 144. Based on various input parameters of the system 100 and the engine 102, the first uncertainty recognition mechanism 151 may be configured to determine deviations in the operating parameters using the supply of the fuel to the engine 102. Thus, the adaptive adjustment mechanism 152, in communication with the first uncertainty recognition mechanism 151, may determine the adjustment factor based on the internal uncertainties of the system 100.

In another embodiment, an external noise and disturbance, represented by a block 153 in FIG. 4, may be filtered by a second uncertainty recognition mechanism 155 of the system 100. The external noise and disturbance are unavoidable and may need to be considered for robust control. For example, the disturbance may increase or decrease the signals indicative of the first desired pressure 'PD1' and the second desired pressure 'PD2' of the fuel. In another example, the noise may affect a measured value of the first pressure and the second pressure determined by the first pressure sensor 'P1' and the second pressure sensor 'P2', respectively. Thus, the noise and the disturbances may affect the first control signal and the second control signal communicated to the first actuator 162A and the second actuator 164A, respectively.

In one example, the second uncertainty recognition mechanism 155 may be integrally configured with the adaptive adjustment mechanism 152 and/or the controller 150. In another example, the second uncertainty recognition mechanism 155 may be integrally configured with the control module 144. The second uncertainty recognition mechanism 155 may be configured to filter the noise and the disturbances associated with the first pressure sensor 'P1' and the second pressure sensor 'P2'. Particularly, the second uncertainty recognition mechanism 155 may be configured to filter the noise and the disturbances associated with the signals indicative of the first pressure for the fuel supplied to the pre-combustion chamber 114, the second pressure of the fuel supplied to the main combustion chamber 112, the first desired pressure 'PD1' and the second desired pressure 'PD2' of the fuel. The second uncertainty recognition mechanism 155 may also be configured to filter external noises and disturbances or uncertainties associated with various parameters of the system 100. In an example, the external uncertainties or disturbances may include deviation of output signals of the second sensing unit 148 from what is being expected. The external uncertainties of the output signals of the second sensing unit 148 may be optionally determined based on a predefined data, such as a look up table, stored in the memory module 149 of the control module 144. The adaptive adjustment mechanism 152 may communicate with the second uncertainty recognition mechanism 155 to determine the adjustment factor based on the external uncertainties of the system 100.

The controller 150 is further configured to generate a first control signal and a second control signal based on the signals indicative of the first error 'E1' and the second error 'E2', and the output signal indicative of the adjustment factor. The first control signal is communicated to the first actuator 162A associated with the first valve 162 and the second control signal is communicated to the second actuator 164A associated with the second valve 164. The controller 150 actuates the first actuator 162A based on the first control signal to control the opening of the first valve 162, such that the fuel is supplied to the pre-combustion chamber 114 at the first pressure. Similarly, the controller 150 actuates the second actuator 164A based on the second control signal to control the opening of the second valve 164, such that the fuel is supplied to the main combustion chamber 112 at the second pressure. Thus the controller 150, in communication with the control module 144, the adaptive adjustment mechanism 152 and the pressure regulator 122, is configured to regulate the pressure of the fuel supplied to the pre-combustion chamber 114 to the first pressure and regulate the pressure of the fuel supplied to the main combustion chamber 112 to the second pressure.

In an exemplary embodiment, apart from the signals indicative of the first error 'E1', the second error 'E2' and the output signal indicative of the adjustment factor, a disturbance signal corresponding to atmospheric effects such as ambient pressure, ambient temperature and the likes that affects the system 100. Also, a noise may affect the output signals of the second sensing unit 148. Such noise may also be filtered by the system 100 during generation of the first control signal and the second control signal. The controller 150 generates one or more control parameters. A control function of the controller 150 may be defined using the one or more control parameters. The control function is enabled to generate the first control signal and the second control signals for the first actuator 162A and the second actuator 164A respectively.

Figure 5:
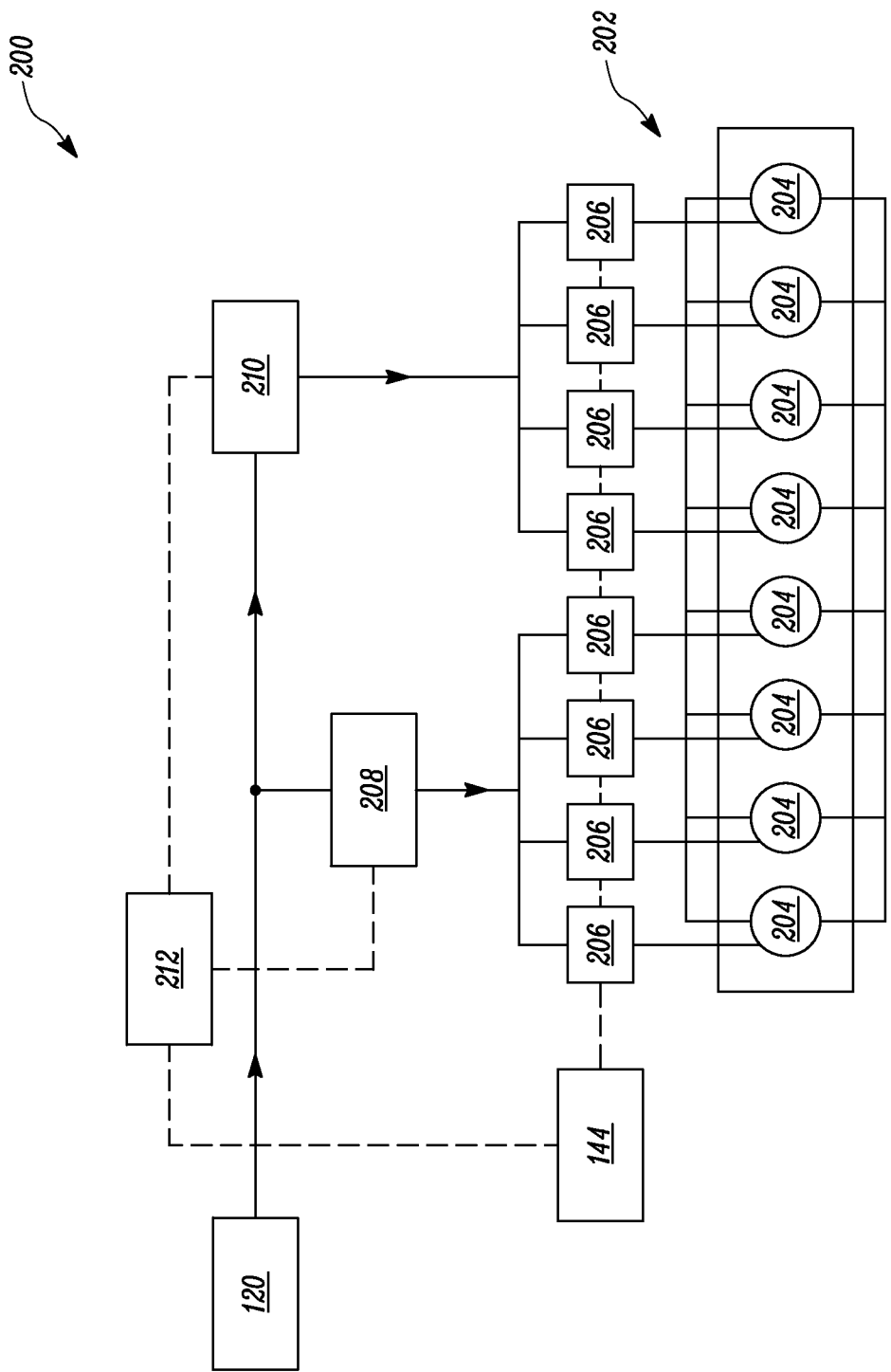
FIG. 5 is a schematic block diagram showing a system for supplying fuel to an engine, according to another embodiment of the present disclosure.

FIG. 5 illustrates a schematic block diagram showing a system 200 for supplying the fuel to an engine 202, according to another embodiment of the present disclosure. The engine 202 includes multiple cylinders 204. For illustration purpose of the present disclosure, eight cylinders of the engine 202 are shown in FIG. 5. Each of the eight cylinders of the engine 202 is provided with a gas admission valve 206 for supplying the fuel to the cylinder 204. Particularly, the gas admission valve 206 may be configured to supply the fuel to a main combustion chamber (not shown) of the engine 202. In an embodiment, each of the eight cylinders 204 may also be associated with additional gas admission valve for supplying fuel to a pre-combustion chamber (not shown) of the engine 202.

The system 200 includes a first pressure regulator 208 and a second pressure regulator 210 configured to control a pressure of the fuel supplied to the main combustion chamber of the eight cylinders. The fuel is supplied from the fuel supply tank 120 to the engine 202 through the first pressure regulator 208 and the second pressure regulator 210. In the embodiment shown in FIG. 5, the first pressure regulator 208 is configured to regulate the pressure of the fuel supplied to a first set of cylinders among the eight cylinders. The first set of cylinders includes four cylinders. Similarly, the second pressure regulator 210 is configured to regulate the pressure of the fuel supplied to a second set of cylinders among the eight cylinders. The second set of cylinders includes four cylinders. In various embodiments, multiple sets of equal number of cylinders may be communicated with multiple pressure regulators to supply the fuel at a desired pressure, as providing each of the multiple cylinders with a pressure regulator has limitations.

The system 200 further includes a controller 212 configured to communicate to the first pressure regulator 208 and the second pressure regulator 210. The controller 212 is further configured to communicate to the control module 144. The controller 212 is further configured to generate multiple output control signals to communicate with the first pressure regulator 208 and the second pressure regulator 210 to control the desired pressure of the fuel supplied to each of the eight cylinders. The controller 212 may be same as the controller 150 disclosed in the system 100 or may be additionally programmed to generate multiple output control signals to control the first pressure regulator 208 and the second pressure regulator 210. The controller 212 may also be in communication with the adaptive adjustment mechanism 152 to generate the multiple output signals based on the adjustment factor determined by the adaptive adjustment mechanism 152.

INDUSTRIAL APPLICABILITY

The present disclosure relates to the system 100 and a method 300 for supplying the fuel to the engine 102. The system 100 includes the control module 144, the controller 150, the adaptive adjustment mechanism 152 and the pressure regulator 122 to control the pressure of the fuel supplied to the pre-combustion chamber 114 and the main combustion chamber 112 to the first pressure and the second pressure, respectively. The controller 150 is configured to receive multiple input parameters, such as the speed of the engine 102, the quantity of the fuel supplied to the engine 102, the ignition mode of the engine 102, and the pressure and temperature of the ambient air. The controller 150 is further configured to generate multiple output parameters, such as the first control signal and the second control signal to control the first valve 162 and the second valve 164 to supply the fuel to the pre-combustion chamber 114 and the main combustion chamber 112 at the first pressure and the second pressure, respectively.

Figure 6:
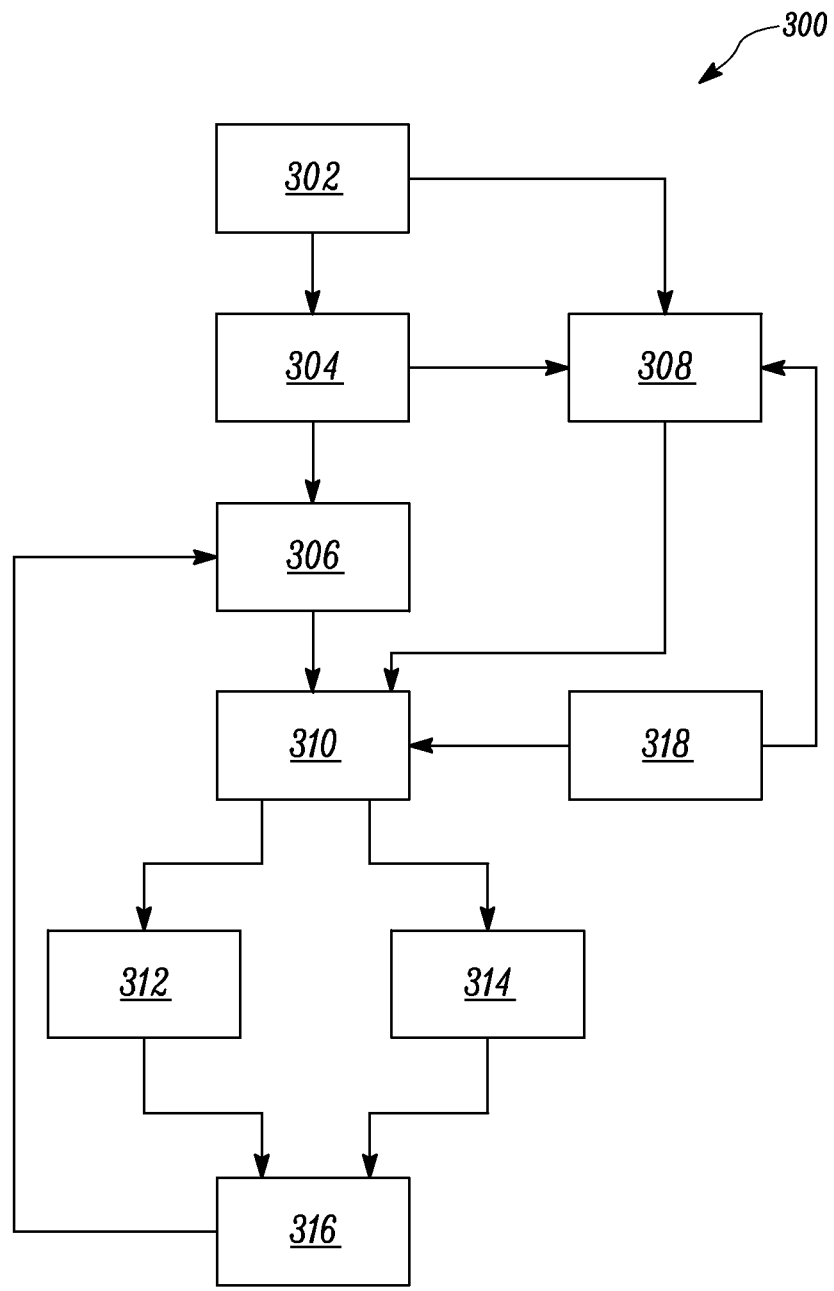
FIG. 6 is a flow chart explaining a method of controlling the pressure of the fuel supplied to the main combustion chamber and the pre-combustion chamber of the engine, according to an embodiment of the present disclosure.

FIG. 6 illustrates a flow chart of the method 300 of controlling the pressure of the fuel supplied to the pre-combustion chamber 114 and the main combustion chamber 112, according to an embodiment of the present disclosure.

At block 302, the method 300 includes generating the signals indicative of the multiple operating parameters of the engine 102, such as the speed of the engine 102, the quantity of the fuel supplied to the engine 102 and the ignition mode of the engine 102, and the multiple ambient conditions, such as the pressure and temperature of the ambient air. In an example, the signals indicative of the multiple operating parameters and the multiple ambient conditions of the engine 102 may be generated by the first sensing unit 146 at time 'T0'. The speed sensor 146A, the fuel flow rate sensor 146B, the detonation sensor 146C disposed on the engine 102 generate the signals indicative of the speed of the engine 102, the quantity of the fuel supplied to the engine 102 and the derived ignition mode of the engine 102. Further, the first sensor 146D and the second sensor 146E generate the signals indicative of the ambient pressure and the ambient temperature of the engine 102.

The signals indicative of the multiple operating parameters and the multiple ambient conditions of the engine 102 are further communicated to the control module 144. At block 304, the method 300 includes determining the first desired pressure 'PD1' and the second desired pressure 'PD2' of the fuel that is to be supplied to the pre-combustion chamber 114 and the main combustion chamber 112, respectively. In an example, the control module 144 may be configured to compare the speed of the engine 102, the quantity of the fuel supplied to the engine 102, the ignition mode of the engine 102, and the ambient pressure and temperature of the engine 102 determined at the time 'T0' with the predefined data stored in the memory module 149 of the control module 144. The first desired pressure 'PD1' and the second desired pressure 'PD2' of the fuel may optionally vary with respect to the time based on the multiple operating parameters and the multiple ambient conditions of the engine 102 determined at various intervals of time. For example, the first desired pressure 'PD1' and the second desired pressure 'PD2' determined at the time 'T0' may be different from a first desired pressure and a second desired pressure determined at time 'T3'.

At block 306, the method 300 includes determining the first error 'E1' and the second error 'E2' associated with the pressure of the fuel supplied to the pre-combustion chamber 114 and the main combustion chamber 112, respectively. The control module 144, in communication with the first pressure sensor 'P1' and the second pressure sensor 'P2' receives the signals indicative of the first pressure and the second pressure of the fuel supplied to the pre-combustion chamber 114 and the main combustion chamber 112, respectively. The control module 144 determines the first error 'E1' based on the predefined mathematical relationship between the first desired pressure 'PD1' and the first pressure of the fuel. Similarly, the control module 144 determines the second error 'E2' based on the predefined mathematical relationship between the second desired pressure 'PD2' and the second pressure of the fuel. Further, the control module 144 generates the signals indicative of the first error 'E1' and the second error 'E2' to communicate to the controller 150.

At block 308, the signals indicative of the multiple operating parameters and the multiple ambient conditions are communicated to the adaptive adjustment mechanism 152. Further, the signals indicative of the first desired pressure 'PD1' and the second desired pressure 'PD2' are communicated to the adaptive adjustment mechanism 152. The adaptive adjustment mechanism 152 is also in communication with the pressure sensor 166 and the temperature sensor 168 of the pressure regulator 122 to receive the signals indicative of the pressure and the temperature of the fuel received within the pressure regulator 122. The adaptive adjustment mechanism 152 further determines the adjustment factor based on various inputs including, but not limited to, the signals indicative of the multiple operating parameters and the multiple ambient conditions of the engine 102, the signals indicative of the first desired pressure 'PD1' and the second desired pressure 'PD2' of the fuel, and the signals indicative of the pressure and the temperature of the fuel received within the pressure regulator 122. The adaptive adjustment mechanism 152 generates the output signal indicative of the adjustment factor to communicate to the controller 150.

At block 310, the method 300 includes receiving the signals indicative of the first error 'E1' and the second error 'E2', and the output signal indicative of the adjustment factor by the controller 150. The controller 150 further generates the first control signal and the second control signal based on the signals indicative of the first error 'E1' and the second error 'E2', and the output signal indicative of the adjustment factor. At block 312, the method 300 includes communicating the first control signal to the first actuator 162A associated with the first valve 162. The controller 150 actuates the first actuator 162A based on the first control signal to control the opening of the first valve 162. Thus, the pressure of the fuel supplied to the pre-combustion chamber 114 through the first valve 162 is regulated to the first pressure. Similarly, at block 314, the method 300 includes communicating the second control signal to the second actuator 164A associated with the second valve 164. The controller 150 actuates the second actuator 164A based on the second control signal to control the opening of the second valve 164. Thus, the pressure of the fuel supplied to the main combustion chamber 112 through the second valve 164 is regulated to the second pressure. Thus the controller 150 regulates the pressure of the fuel supplied to the pre-combustion chamber 114 to the first pressure and regulates the pressure of the fuel supplied to the main combustion chamber 112 to the second pressure for controlling the operation of the engine 102. At block 316, the second sensing unit 148, in communication with the first fuel supply line 124 and the second fuel supply line 126, generates the signals indicative of the first pressure of the fuel supplied to the pre-combustion chamber 114 and the second pressure of the fuel supplied to the main combustion chamber 112 at the time 'T0'. Further, the signals indicative of the first pressure and the second pressure of the fuel are communicated to the control module 144. Based on the first pressure and the second pressure of the fuel, the control module 144 determines the first error 'E1' and the second error 'E2' at the time 'T0'.

At block 318, the method 300 includes deriving or determining external noises or disturbances associated with the first pressure sensor 'P1' and the second pressure sensor 'P2'. The second uncertainty recognition mechanism 155, in communication with the control module 144, the controller 150, the adaptive adjustment mechanism 152, derives the disturbances or uncertainties associated with the signals indicative of the first pressure for the fuel supplied to the pre-combustion chamber 114, the second pressure of the fuel supplied to the main combustion chamber 112, first desired pressure 'PD1' and the second desired pressure 'PD2' of the fuel. The adaptive adjustment mechanism 152, in communication with the second uncertainty recognition mechanism 155, may determine the adjustment factor based on the internal uncertainties of the system 100.

Figure 7:
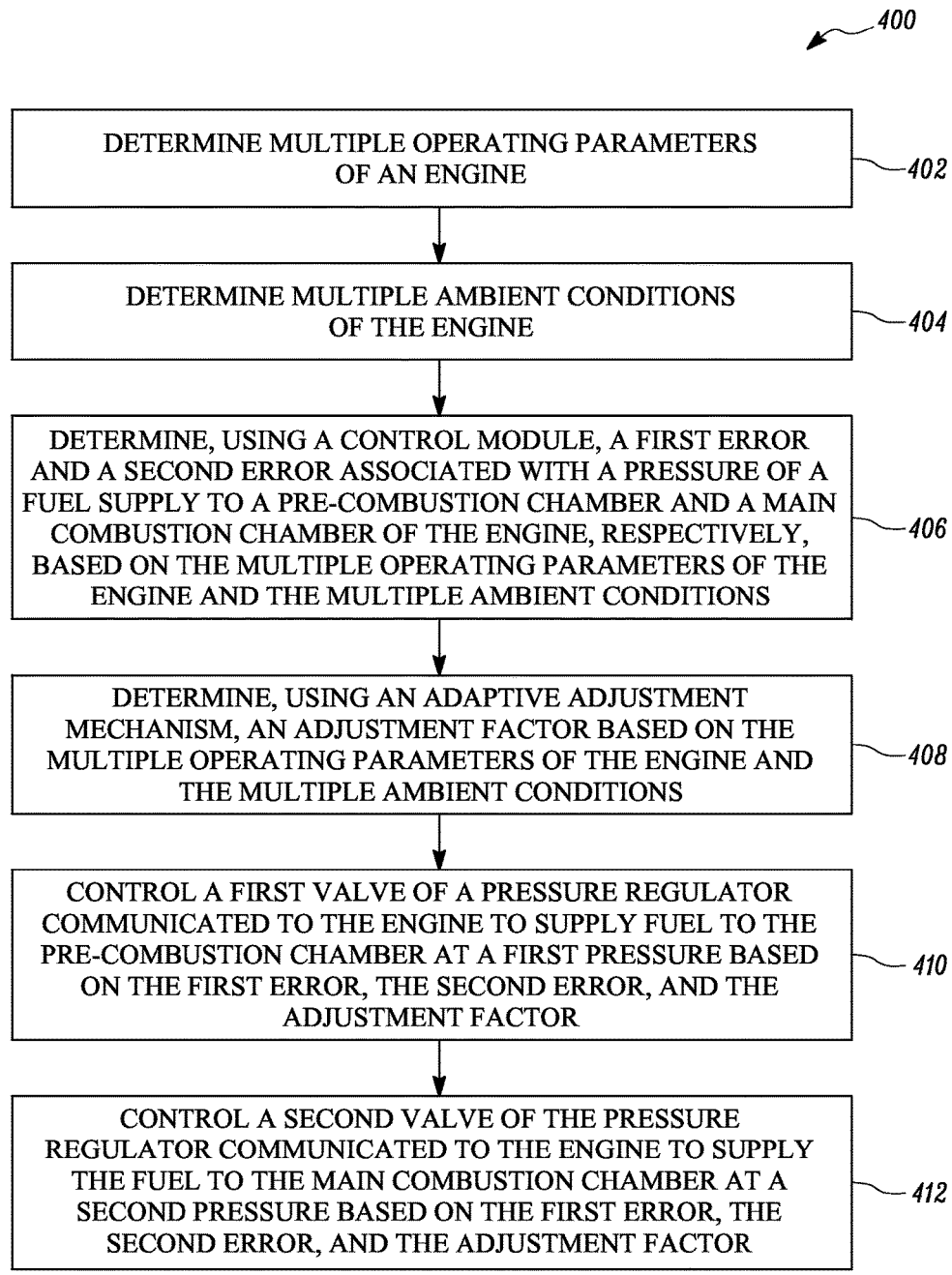
FIG. 7 is a flow chart of a method of supplying the fuel to the engine, according to an embodiment of the present disclosure.

FIG. 7 illustrates a flow chart of a method 400 of supplying the fuel to the engine 102, according to an embodiment of the present disclosure. At block 402, the method 400 includes determining the multiple operating parameters of the engine 102. The speed sensor 146A, the fuel flow rate sensor 146B, the detonation sensor 146C of the first sensing unit 146 generate the signals indicative of the speed of the engine 102, the quantity of the fuel supplied to the engine 102 and the derived ignition mode of the engine 102. The first sensing unit 146 may optionally include additional sensors for generating signals indicative of the multiple operating parameters. Various other parameters associated with the operation of the engine 102 may also be considered for determining the multiple operating parameters. At block 404, the method 400 includes determining the multiple ambient conditions of the engine 102. The first sensor 146D and the second sensor 146E of the first sensing unit 146 generate the signals indicative of the ambient pressure and the ambient temperature of the engine 102. Various other ambient conditions, such as a humidity of the ambient air may also be considered for determining the multiple ambient conditions of the engine 102.

At block 406, the method 400 includes determining the first error 'E1' and the second error 'E2' associated with the pressure of the fuel supplied to the pre-combustion chamber 114 and the main combustion chamber 112, respectively, based on the multiple operating parameters and the multiple ambient conditions of the engine 102. The control module 144 determines the first desired pressure 'PD1' and the second desired pressure 'PD2' based on the multiple operating parameters and the multiple ambient conditions of the engine 102. The control module 144 further determines the first error 'E1' based on the first desired pressure 'PD1' and the first pressure of the fuel, and determines the second error 'E2' based on the second desired pressure 'PD2' and the second pressure of the fuel. In various embodiments, the first error 'E1' may be determined based on any predefined mathematical relationship between the first desired pressure 'PD1' and the first pressure and the second error 'E2' may be determined based on any predefined mathematical relationship between the second desired pressure 'PD2' and the second pressure.

At block 408, the method 400 includes determining the adjustment factor based on the multiple operating parameters and the multiple ambient conditions of the engine 102. The adaptive adjustment mechanism 152, in communication with the control module 144, the first sensing unit 146 and the pressure regulator 122, receives the signals indicative of the multiple operating parameters and the multiple ambient conditions of the engine 102, the signals indicative of the first desired pressure 'PD1' and the second desired pressure 'PD2' of the fuel to be supplied to the engine 102 and the signals indicative of the pressure and the temperature of the fuel received within the pressure regulator 122. The adaptive adjustment mechanism 152 further determines the adjustment factor based on the various inputs to generate the output signal indicative of the adjustment factor.

At block 410, the method 400 includes controlling the first valve 162 of the pressure regulator 122 to supply the fuel to the pre-combustion chamber 114 at the first pressure based on the first error 'E1', the second error 'E2', and the adjustment factor. The controller 150 communicates to the control module 144 to receive the signals indicative of the first error 'E1' and the second error 'E2'. Further, the controller 150 communicates to the adaptive adjustment mechanism 152 to receive the output signal indicative of the adjustment factor. The controller 150 further generates the first control signal based on the signals indicative of the first error 'E1', the second error 'E2', and the output signal indicative of the adjustment factor. The first control signal is communicated to the first actuator 162A of the first valve 162 to control the opening of the first valve 162. Thus, the pressure of the fuel supplied to the pre-combustion chamber 114 through the first valve 162 is regulated to the first pressure. At block 412, the method 400 includes controlling the second valve 164 of the pressure regulator 122 to supply the fuel to the main combustion chamber 112 at the second pressure based on the first error 'E1', the second error 'E2', and the adjustment factor. The controller 150 generates the second control signal based on the signals indicative of the first error 'E1', the second error 'E2', and the output signal indicative of the adjustment factor. The second control signal is communicated to the second actuator 164A of the second valve 164 to control the opening of the second valve 164. Thus, the pressure of the fuel supplied to the main combustion chamber 112 through the second valve 164 is regulated to the second pressure.

In an example, if the supply of the fuel experiences instability issues, such as leakage in the fuel supply line and/or the input pressure of the fuel is unstable, flow rate at which the fuel is supplied to the first gas admission valve 116 and the second gas admission valve 118 through the first fuel supply line 124 and the second fuel supply line 126, respectively, may also fluctuate. For example, if the input pressure of the fuel supplied to the pressure regulator 122 decreases, then the opening of the first valve 162 and the second valve 164 needs to be decreased to maintain the first pressure and the second pressure of the fuel supplied to the pre-combustion chamber 114 and the main combustion chamber 112. Further, opening of the first valve 162 earlier than the second valve 164 or opening of the second valve 164 earlier than the first valve 162 may cause change in the pressure of the fuel supplied to the first gas admission valve 116 and the second gas admission valve 118. Hence, the first valve 162 and the second valve 164 may be controlled to open and close together to control air fuel ratio for the main combustion chamber 112 and the pre-combustion chamber 114. In another example, if a load acting on the engine 102 vary, the pressure at which the fuel supplied to the main combustion chamber 112 increases, which may demand to open the second valve 164 fast. This may apparently decrease the flow of the fuel at the first outlet port 158 immediately after the adjustment of the second valve 164, if the first valve 162 and the second valve 164 are controlled separately. Thus, the controller 150 of the present disclosure controls the opening and the closing of the first valve 162 and the second valve 164 simultaneously. This minimizes disturbance of the first pressure and the second pressure of the fuel that may be caused by external uncertainties, such as the deviations in the operating parameters during the supply of the fuel to the engine 102.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for supplying fuel to an engine, the system comprising:
    a first sensing unit configured to generate signals indicative of multiple operating parameters of the engine, and multiple ambient conditions;
    an adaptive adjustment mechanism in communication with the first sensing unit;
    a pressure regulator having a first valve in communication with a pre-combustion chamber of the engine, and a second valve in communication with a main combustion chamber of the engine; and
    a controller in communication with the adaptive adjustment mechanism and the pressure regulator, the controller configured to:
        receive a signal indicative of a first error associated with a pressure of a fuel supply to the pre-combustion chamber;
        receive a signal indicative of a second error associated with a pressure of a fuel supply to the main combustion chamber;
        receive, using the adaptive adjustment mechanism, an output signal indicative of an adjustment factor determined based on the multiple operating parameters of the engine and the multiple ambient conditions;
        control the first valve of the pressure regulator, based on the signals indicative of the first error, the second error, and the output signal indicative of the adjustment factor, to supply the fuel to the pre-combustion chamber at a first pressure; and
        control the second valve of the pressure regulator, based on the signals indicative of the first error, the second error, and the output signal indicative of the adjustment factor, to supply the fuel to the main combustion chamber at a second pressure.

2. The system of claim 1 comprising a second sensing unit disposed downstream of the pressure regulator, the second sensing unit configured to generate signals indicative of the first pressure of the fuel supplied to the pre-combustion chamber and the second pressure of the fuel supplied to the main combustion chamber.

3. The system of claim 2 comprising a control module in communication with the first sensing unit and the second sensing unit, the control module configured to:
    determine a first desired pressure of the fuel to be supplied to the pre-combustion chamber based on the signal received from the first sensing unit, wherein the first error is determined based on the first desired pressure and the first pressure of the fuel supplied to the pre-combustion chamber; and
    determine a second desired pressure of the fuel to be supplied to the main combustion chamber based on the signal received from the first sensing unit, wherein the second error is determined based on the second desired pressure and the second pressure of the fuel supplied to the main combustion chamber.

4. The system of claim 3, wherein the adaptive adjustment mechanism is in communication with the control module, and configured to:
    receive signals indicative of the first desired pressure and the second desired pressure of the fuel to be supplied to the pre-combustion chamber and the main combustion chamber, respectively; and
    determine the adjustment factor based on the signals indicative of the first desired pressure and the second desired pressure of the fuel.

5. The system of claim 1, wherein the adaptive adjustment mechanism is in communication with the pressure regulator, and configured to:

receive signals indicative of a pressure and a temperature of the fuel received within the pressure regulator; and determine the adjustment factor based on the signals indicative of the pressure and the temperature of the fuel received within the pressure regulator.

6. The system of claim 1, wherein the controller is configured to:

generate a first control signal and a second control signal based on the signals indicative of the first error and the second error, and the output signal indicative of the adjustment factor;

communicate the first control signal to a first actuator associated with the first valve; and communicate the second control signal to a second actuator associated with the second valve.

7. The system of claim 1, wherein the multiple operating parameters of the engine comprises a speed of the engine, a quantity of fuel supplied to the engine and an ignition mode of the engine.

8. The system of claim 1, wherein the multiple ambient conditions comprises a pressure and a temperature of ambient air.

9. A method of supplying fuel to an engine, the method comprising:

determining multiple operating parameters of the engine;

determining multiple ambient conditions of the engine;

determining, using a control module, a first error and a second error associated with a pressure of a fuel supply to a pre-combustion chamber and a main combustion chamber of the engine, respectively, based on the multiple operating parameters of the engine and the multiple ambient conditions;

determining, using an adaptive adjustment mechanism, an adjustment factor based on the multiple operating parameters of the engine and the multiple ambient conditions;

controlling a first valve of a pressure regulator communicated to the engine to supply the fuel to the pre-combustion chamber at a first pressure based on the first error, the second error, and the adjustment factor; and controlling a second valve of the pressure regulator communicated to the engine to supply the fuel to the main combustion chamber at a second pressure based on the first error, the second error, and the adjustment factor.

10. The method of claim 9 further comprising monitoring the first pressure of the fuel and the second pressure of the fuel, downstream of the pressure regulator.

11. The method of claim 9 further comprising:

determining a first desired pressure of the fuel to be supplied to the pre-combustion chamber based on the multiple operating parameters of the engine and the multiple ambient conditions, wherein the first error is determined based on the first desired pressure and the first pressure of the fuel supplied to the pre-combustion chamber; and determining a second desired pressure of the fuel to be supplied to the main combustion chamber based on the multiple operating parameters of the engine and the multiple ambient conditions, wherein the second error is determined based on the second desired pressure and the second pressure of the fuel supplied to the main combustion chamber.

12. The method of claim 11 further comprising:

receiving signals indicative of the first desired pressure and the second desired pressure of the fuel to be supplied to the pre-combustion chamber and the main combustion chamber, respectively, by the adaptive adjustment mechanism; and determining the adjustment factor based on the signals indicative of the first desired pressure and the second desired pressure of the fuel.

13. The method of claim 9 further comprising:

receiving signals indicative of a pressure and a temperature of the fuel received within the pressure regulator; and determining the adjustment factor based on the signals indicative of the pressure and the temperature of the fuel received within the pressure regulator.

14. The method of claim 9 further comprising:

generating a first control signal and a second control signal based on the first error, the second error, and the adjustment factor;

communicating the first control signal to a first actuator associated with the first valve; and communicating the second control signal to a second actuator associated with the second valve.

15. An engine comprising:

a main combustion chamber;

a pre-combustion chamber in communication with the main combustion chamber; and a system for supplying fuel to the main combustion chamber and the pre-combustion chamber, the system comprising:

a first sensing unit configured to generate signals indicative of multiple operating parameters of the engine and multiple ambient conditions;

an adaptive adjustment mechanism in communication with the first sensing unit;

a pressure regulator having a first valve in communication with a pre-combustion chamber of the engine and a second valve in communication with a main combustion chamber of the engine; and a controller in communication with the adaptive adjustment mechanism and the pressure regulator, the controller configured to:

receive a signal indicative of a first error associated with a pressure of a fuel supply to the pre-combustion chamber;

receive a signal indicative of a second error associated with a pressure of a fuel supply to the main combustion chamber;

receive, using the adaptive adjustment mechanism, an output signal indicative of an adjustment factor determined based on the multiple operating parameters of the engine and the multiple ambient conditions;

control the first valve of the pressure regulator, based on the signals indicative of the first error, the second error, and the output signal indicative of the adjustment factor, to supply the fuel to the pre-combustion chamber at a first pressure; and control the second valve of the pressure regulator, based on the signals indicative of the first error, the second error, and the output signal indicative of the adjustment factor, to supply the fuel to the main combustion chamber at a second pressure.

16. The engine of claim 15, wherein the system comprises a second sensing unit disposed downstream of the pressure regulator, the second sensing unit configured to generate signals indicative of the first pressure of the fuel supplied to the pre-combustion chamber and the second pressure of the fuel supplied to the main combustion chamber.

17. The engine of claim 16, wherein the system comprises a control module in communication with the first sensing unit and the second sensing unit, the control module configured to:
  determine a first desired pressure of the fuel to be supplied to the pre-combustion chamber based on the signal received from the first sensing unit, wherein the first error is determined based on the first desired pressure and the first pressure of the fuel supplied to the pre-combustion chamber; and
  determine a second desired pressure of the fuel to be supplied to the main combustion chamber based on the signal received from the first sensing unit, wherein the second error is determined based on the second desired pressure and the second pressure of the fuel supplied to the main combustion chamber.

18. The engine of claim 17, wherein the adaptive adjustment mechanism is in communication with the control module, and configured to:
  receive signals indicative of the first desired pressure and the second desired pressure of the fuel to be supplied to the pre-combustion chamber and the main combustion chamber, respectively; and
  determine the adjustment factor based on the signals indicative of the first desired pressure and the second desired pressure of the fuel.

19. The engine of claim 15, wherein the adaptive adjustment mechanism is in communication with the pressure regulator, and configured to:
  receive signals indicative of a pressure and a temperature of the fuel received within the pressure regulator; and
  determine the adjustment factor based on the signals indicative of the pressure and the temperature of the fuel received within the pressure regulator.

20. The engine of claim 15, wherein the controller is configured to:
  generate a first control signal and a second control signal based on the signals indicative of the first error and the second error, and the output signal indicative of the adjustment factor;
  communicate the first control signal to a first actuator associated with the first valve; and
  communicate the second control signal to a second actuator associated with the second valve.

* * * * *